United States Patent [19]
Black et al.

[11] 3,935,447
[45] Jan. 27, 1976

[54] ANGULAR MOTION DETECTION APPARATUS

[75] Inventors: Dewie E. Black, Dearborn Heights; Donald F. Fabry, Garden City; Thaddeus Dombrowski, Detroit, all of Mich.

[73] Assignee: Burroughs Corporation, Detroit, Mich.

[22] Filed: Dec. 26, 1974

[21] Appl. No.: 536,391

Related U.S. Application Data

[60] Division of Ser. No. 396,783, Sept. 13, 1973, which is a continuation of Ser. No. 196,844, Sept. 1, 1971, abandoned.

[52] U.S. Cl. ........... 250/233; 250/231 SE; 250/236; 350/272
[51] Int. Cl.² .......................................... G01D 5/34
[58] Field of Search .......... 250/229, 231 R, 231 SE, 250/233, 237 G, 237 R, 236; 356/29; 350/272, 274

[56] References Cited
UNITED STATES PATENTS

| | | | |
|---|---|---|---|
| 2,247,805 | 7/1941 | Faus | 350/272 X |
| 3,011,020 | 11/1961 | Stamps | 350/272 X |
| 3,553,469 | 1/1971 | Stutz et al. | 250/237 |
| 3,757,128 | 9/1973 | Vermeulen | 250/231 SE |

*Primary Examiner*—Archie R. Borchelt
*Assistant Examiner*—E. R. LaRoche
*Attorney, Agent, or Firm*—Leon E. Redman

[57] ABSTRACT

An apparatus for automatically detecting angular motion of a test object, such as a clutch output, utilizing photoelectric devices in combination with helically apertured light shutters, the electric outputs of the photoelectric devices being interpreted by analog logic. Provision is made for a predetermined number of warm-up rotations of the test object to assure normal working conditions, for a predetermined reference threshold of detected motion, for controlled sequencing of the test object for testing for motion at various predetermined angular positions, and for determining malfunctioning of the test sequencing control.

10 Claims, 7 Drawing Figures

ANGULAR MOTION DETECTION APPARATUS

RELATED APPLICATIONS

This is a division of copending application Ser. No. 396,783 filed Sept. 13, 1973, which is a continuation of application Ser. No. 196,844 filed Sept. 1, 1971, now abandoned.

BACKGROUND OF THE INVENTION

The invention relates to automatic motion test systems in general and more particularly to photoelectric systems employing analog monitoring means with a reference threshold to detect angular motion at a sequenced series of test positions.

Prior art discloses several types of systems used to detect the angular motion of an object. A typical example would be represented by a system using electromechanical means such as sequentially arranged brush or contact arms which are displaced by a moving object so that electrical contacts are either opened or closed, these contacts being electrically coupled to various types of indicators, both electrical and mechanical. Another example, more closely related to the present invention, would be a system using optical means such as photoelectric devices in place of the electromechanical means previously described. Each of these systems is limited in varying degrees by the digital nature of the detecting means. Such systems are capable of detecting only specific increments of motion. The effective resolution of such a system may be increased past a given value only by using prohibitively expensive, precision components.

Analog-type detecting means are also represented in the prior art by systems using mechanical means such as arms or levers disposed in the anticipated path of travel of, or attached to, the object being monitored, those mechanical devices being physically linked to movable indicators. This type of system has obvious limitations with all but the most expensive apparatus due to a lack of precision. More sophisticated analog-type motion-detecting systems, devices again more closely related to the present invention, typically use electrical elements having a mechanically variable impedance, capacitance, or inductance, or use electrical repeating elements such as servo motors. While these systems have a much higher degree of precision than do the strictly mechanical analog types, they have the disadvantages of being considerably more costly to construct and maintain and of being subject to subsequent losses of accuracy due to mechanical wear and deterioration.

It is also known in the art to employ rotatable optical gratings having radial straight lines cooperating with a stationary optical grating also having radial straight lines for modulating light directed therethrough onto a photocell for use in a phase comparator circuit.

SUMMARY OF THE INVENTION

Accordingly, it is an object of this invention to improve angular motion detection systems by monitoring the motion of a test object on a continuous, analog basis rather than merely on an incremental digital basis.

It is a further object of this invention to increase the precision in detection of angular motion of a test object.

It is yet a further object of this invention to reduce the construction and maintenance cost of angular motion test apparatus while retaining high precision detection.

It is another object of this invention to improve the reliability of angular motion test apparatus.

These and other objects are achieved in the disclosed angular motion test apparatus utilizing a pair of helically apertured members interacting in a path of light between photoelectric devices whose output is interpreted by analog logic to precisely detect angular motion of a test object sequentially intermitted at various angular positions by test apparatus which includes monitors and logic for determining malfunctioning of the test apparatus itself and error indicators.

BRIEF DESCRIPTION OF THE DRAWINGS

These and other objects, aspects and advantages of the invention will be more clearly understood from the following description when read in conjunction with the accompanying drawings, in which.

The logic elements depicted in the drawings are standard NAND gates, negated OR gates, inverters, drivers, amplifiers, delay multivibrators and flip flops.

DETAILED MECHANICAL DESCRIPTION OF THE INVENTION

Figures 1, 2, 3, 4:
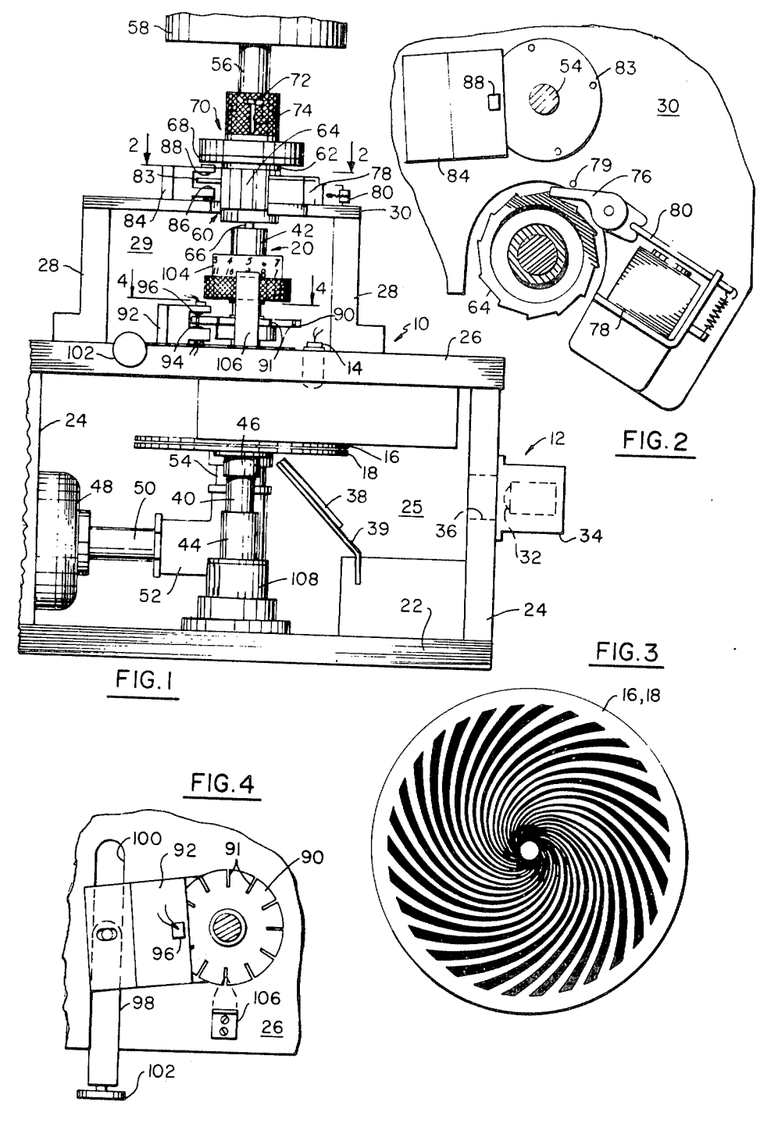
FIG. 1 is a side view, partially fragmented, of an automatic motion test system embodying features of the invention.
FIG. 2 is an enlarged top view of a portion of the motion test system illustrating the effective engagement of a solenoid-controlled pawl with a typical, ratchet-controlled, spring-type clutch and showing also the relative disposition of an input monitor device, the view being taken along the line 2—2 of FIG. 1.
FIG. 3 is an enlarged, top view of one of a pair of identical, optically apertured disks which together form an optical shutter.
FIG. 4 is an enlarged, top view taken along the line 4—4 of FIG. 1 of a portion of the test system showing an output monitor and its associated adjustment mechanism.

The automatic motion test system shown in FIG. 1 has a support structure or frame, generally indicated at 10, a light projector generally indicated at 12, a light detector 14, a first optically apertured member or disk 16, a second optically apertured member or disk 18 and a mounting member generally indicated at 20. The light projector 12 and detector 14 are mounted on the frame in effective apposition to each other; and the first disk 16 is secured to the frame 10 therebetween, the second disk 18 being rotatably mounted cooperatively adjacent the first disk. The mounting member 20 is rotatably secured to the frame and is coaxial with the second disk 18.

The frame 10 has a base plate 22 which supports a pair of upright, lower side plates 24—24 and a lower back plate 25. Resting on the lower side and back plates is a horizontal median plate 26, and extending upwardly therefrom are a pair of upper side plates 28—28 and an upper back plate 29. Supported on the upper side and back plates is an upper horizontal plate 30.

The light projector 12 has a lamp 32 mounted in a housing 34 affixed to one of the lower side plates 24.

An aperture 36 in the plate 14 opposite the lamp 32 permits the path of light emitted by the latter to pass through the plate in a leftward, horizontal direction, as shown in FIG. 1. Mounted in the median horizontal plate 26 is the light detector 14, it being any one of a number of well-known, photoelectric devices, its effective axis intersecting at right angles the path of light traveling from the light projector 12. A light reflecting member or mirror 38 is effectively disposed in the path of light such that it reflects the path of light at right angles, directing it toward the light detector 14. The mirror is affixed to a bracket 39, which is secured to the base plate 22.

The first optically apertured member or disk 16 is affixed to a block 41 depending from the horizontal median plate 26 and is positioned such that the path of light reflected toward the light detector 14 by the mirror 38 will pass through a predetermined portion of the disk. The disk 16 has similar and alternately spaced apart optically opaque and light permeable areas, the preferred embodiment shown by FIG. 3 having opaque and light-permeable areas which increase width from the axis of the disk outward and are disposed in a helically radiating pattern whereby a plurality of the helical light permeable and opaque areas intersects an imaginary straight line radiating from the axis. The mounting member 20 has a rotatable mounting shaft 40, an upper mounting sleeve 42, a lower mounting sleeve 44 and a disk mounting sleeve 46. The shaft is journaled through the median horizontal plate 26, passing centrally through the first disk 16. The upper mounting sleeve 42 is secured to the end of the shaft 40 extending above the plate 30; and the lower mounting sleeve 44 is secured to the end of the shaft 40 extending therebelow, the disk mounting sleeve 46 being affixed to the shaft between the plate and the lower mounting sleeve. The second disk 18 is secured to the disk mounting sleeve 46 such that the disk 18 coaxially underlies the first disk 16, the second disk being rotatable with respect thereto upon rotation of the mounting shaft. The path of light from the projector 12 passing through a portion of the first disk 16 will pass through a corresponding portion of the second disk 18 having a pattern substantially identical to the first disk 16 pattern and radiating in the same direction.

An electric motor 48, which may be any one of a number of well-known, constant-speed motors and of which only a portion is shown, is mounted on the base plate 22. It is coupled via a horizontal drive shaft 50 and an angle drive 52 to a vertical input shaft 54 journaled in the frame 10. The input shaft 54 is operatively coupled to an input coupling shaft 56 by an input transmission 58, only a portion of which is shown, the transmission internally comprising a set of sprockets (not shown) affixed respectively to the upper ends of the input shaft 54 and the input coupling shaft 56 and a chain (also not shown) operatively coupling the sprockets in a 1:1 ratio.

An object that might be tested by this device would typically be a spring-type, ratchet-controlled clutch 60 having an input hub or rotary input mechanism 62, a control ratchet or rotary control mechanism 64 and an output shaft or rotary output mechanism 66. The input hub control ratchet and output shaft members of such a clutch are intermittently coupled by a helical spring (not shown) which is typically affixed to one member and frictionally coupled to the other member, the frictional coupling being released upon restraining the rotation of the control ratchet with respect to that of the input hub. A clutch of this type being tested would be positioned as shown by FIG. 1. The upper mounting sleeve 42 has an aperture in its uppermost end to receive the output shaft 66. The output shaft has a chordal flat at its distant end which is angularly abuttable with a complementary flat formed within the apertured sleeve 42 such that, once the shaft is properly seated in the sleeve, any angular displacement of the former will cause a similar displacement of the latter. A ring 68 is pressed over the input hub 62. A mounting collar 70 is slidably mounted on the input coupling shaft 56 and has a pair of drive pins (not shown) extending downwardly into associated apertures in the ring to ensure the dependent rotation thereof. Once positioned, the collar is held downwardly against the ring by a mounting pin 72 which extends radially outward from the shaft 56 through a T-shaped locking slot 74 in the collar.

Pivotally mounted on the upper horizontal plate 30 is a retractable pawl 76, best shown by FIG. 2, which normally engages a tooth of the clutch control ratchet 64. Also mounted on the plate 30 is an electrically actuatable solenoid 78 having an armature 80, the free end of which engages one end of the pawl 76 such that an actuation of the solenoid will pivot the pawl, thereby retracting the abutting end thereof away from engagement with the control ratchet teeth. The plate 30 has an aperture 79 adjacent the pawl 76. The aperture 79 is exposed when the pawl 76 is engaged with the teeth of the control ratchet 64 for intermitting rotation of the rotary control mechanism or ratchet but is covered by the pawl whenever the latter is pivoted away from the control ratchet by the solenoid 78. Mounted beneath the plate and aligned with the aperture 79 therethrough is a pawl monitor lamp 81 (FIG. 6), and mounted effectively above the aperture and the pawl is a pawl monitor light detector 82 (FIG. 6), it being any one of a number of well-known photoelectric devices. The lamp 81 and detector 82 are disposed such that light from the former will pass through the aperture 79 in the plate and be detected by the latter whenever the pawl 76 engages the control ratchet teeth, the passage of light being blocked when the pawl is disengaged. While only one pawl and solenoid combination is shown for the sake of illustration, it should be understood that a second such combination could also be disposed on the plate 30 to provide for controlling clutches operatively rotatable in a direction opposite to that of the clutch as shown.

Coaxially affixed to the input shaft 54 is an input monitor disk 83 having a number, in this particular embodiment, four, of symmetrically spaced apertures 85 disposed therein. Mounted atop the upper horizontal plate 30 is an input monitor bracket 84 having a pair of arms spanning the disk, the arm underlying the disk supporting an input monitor lamp 86 and the overlying arm supporting an input monitor light detector 88, it being any one of a number of well-known, photoelectric devices, in effective apposition such that the apertures 85 will pass sequentially therebetween as the input monitor disk 83 is rotated.

Coaxially affixed to the mounting shaft 40 is an output or rotary control mechanism monitor disk 90 having a number of symmetrically spaced, radially directed slots 91 marginally disposed therein. The number of slots 91 in the disk 90 corresponds to the number of teeth on the clutch control ratchet 64, in this particular embodiment, twelve. Mounted atop the horizontal median plate 26 and pivotally about the axis of the mounting shaft 40 is an output monitor bracket 92 having a pair of arms spanning the disk 90, the arm underlying the disk 90 supporting an output monitor lamp 94 and the overlying arm supporting a control mechanism monitor light detector 96, it also being any one of a number of well-known, photoelectric devices, in effective apposition such that the radial slots 91 will pass sequentially therebetween as the output or rotary control mechanism monitor disk 90 is rotated.

A manual adjustment, best shown by FIG. 4, is provided for aligning the control mechanism monitor means via positioning the output monitor bracket 92. The adjustment has an arm 98 slidably guided in a slot 100 in the median horizontal plate 26 and also has an adjusting screw 102 threaded into the plate 26. The arm is pivotally attached at one of its ends to the bracket 92 and is attached at its other end to the adjustment screw 102 such that the latter may be rotated to pivot the bracket, thereby revolving the output monitor lamp 94 and light detector 96 curvilinearly along the path defined by the revolving slots 91 in the output monitor disk 90.

Also coaxially affixed to the mounting shaft 40 and overlying the output monitor disk 90 is a visual index collar 104 having numeric characters peripherally displayed thereon corresponding to the teeth on the clutch control ratchet 64. A pointer 106 is secured atop the median horizontal plate 26 and is directed toward the numeric characters on the collar to provide visual verification of the angular output position of the clutch 60.

The mounting shaft 40, as mentioned previously, has a lower mounting sleeve 44 secured to its lowermost end. This serves to couple the shaft to a drag mechanism 108, which is affixed to the base plate 22. This mechanism is a frictional device which serves to minimize any rotational overshoot by or spurious oscillations in the mounting shaft 40.

OPERATION OF THE INVENTION

The automatic motion test system is shown by FIG. 1 as having a spring-type, ratchet-controlled clutch 60 disposed therein for testing. To position a clutch of this type in the test system, the mounting collar 70 is rotated until the slot 74 is aligned with the mounting pin 72 and is then slid upwardly along the input coupling shaft 56. A clutch, having had a ring 68 previously pressed over its input hub 62, may then be mounted by inserting its output shaft 66 into the aperture in the top of the upper mounting sleeve 42, seating the shaft so that the chordal flat at its distant end is in angular abutment with the complementary flat formed within the apertured sleeve. When the output shaft is properly seated, the upper mounting sleeve will rotate therewith. The mounting collar 70 is then lowered, its depending pair of drive pins being received by associated apertures in the ring 68 such that the two will rotate together. The collar is then rotated with respect to the input coupling shaft 56 so that the mounting pin 72 radially extending from the latter rests in the appropriate arm of the T-shaped slot 74 as shown.

Figure 5:
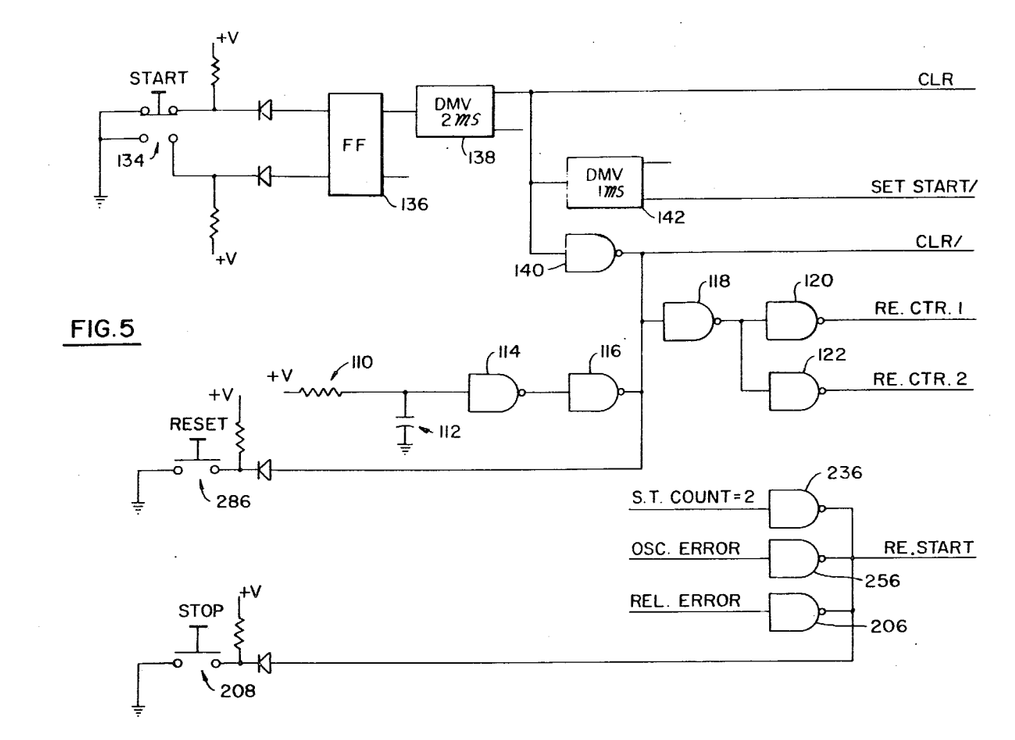
FIG. 5 is a diagram of start, reset and stop logic used in the motion test system.

When power is first applied to the device, the signal CLR/ will be generated by way of the resistor 110, the capacitor 112 and the gates 114 and 116 as shown by FIG. 5. At the same time, signal RE.CTR.1 is formed by way of the additional gates 118 and 120 and signal RE.CTR.2 is formed by way of the gates 118 and 122. This ensures that the counters and flip-flops will all be reset to their respective initial states.

Figure 7:
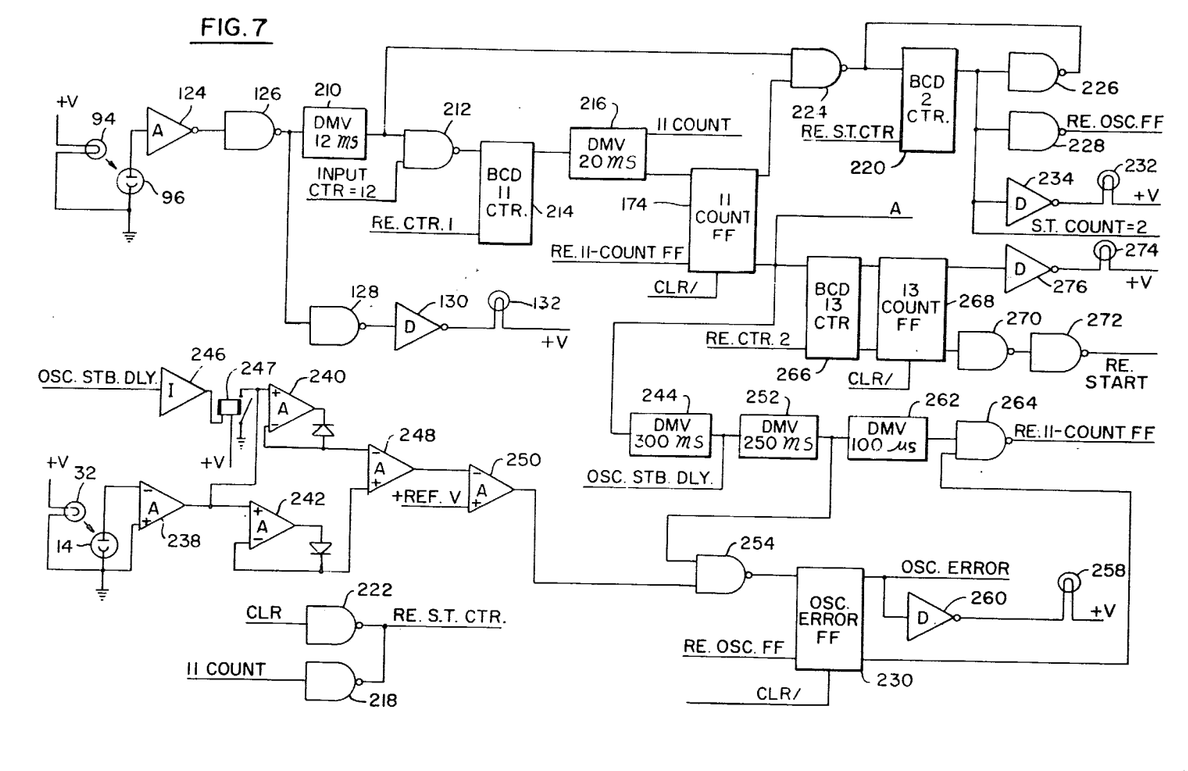

With the test clutch 60 in place and angularly disposed such that the pawl 76 abuts one of the teeth of the control ratchet 64, the adjusting screw 102 may be manually turned, pivoting the output monitor bracket 92 until the path of light traveling from the output monitor lamp 94 to the output monitor light detector 96 is aligned with one of the slots 91 on the output monitor disk 90. When the detector 96 is exposed to the light from the lamp 94, the input of an associated cell amplifier 124 (FIG. 7) is driven low. The resulting high output from the amplifier is inverted by a gate 126 and again inverted by another gate 128 before being applied to a lamp driver 130 to actuate a SET-UP ZERO indicator lamp 132. This indication provides visual evidence that the apparatus is in proper disposition to begin a testing sequence.

When the momentary-contact START switch 134 (FIG. 5) is pressed the automatic sequencing begins as the flip-flop 136, which is usually held in its set state by a low level applied to its set input through a first set of contacts of the switch, will be reset by a low level applied to tis reset input through a second set of switch contacts. When the flip-flop 136 resets, a low level appears on its set output, triggering the 2-millisecond delay multivibrator or DMV 138. The DMV 138 emits a positive, 2-millisecond CLR signal. This pulse is inverted by the gate 140 to form the signals CLR/, RE.CTR.1 and RE.CTR.2. When the output of DMV 138 again goes low after 2-milliseconds, the 1-millisecond DMV 142 is triggered, providing a positive, 1-millisecond pulse, SET START/.

Figure 6:
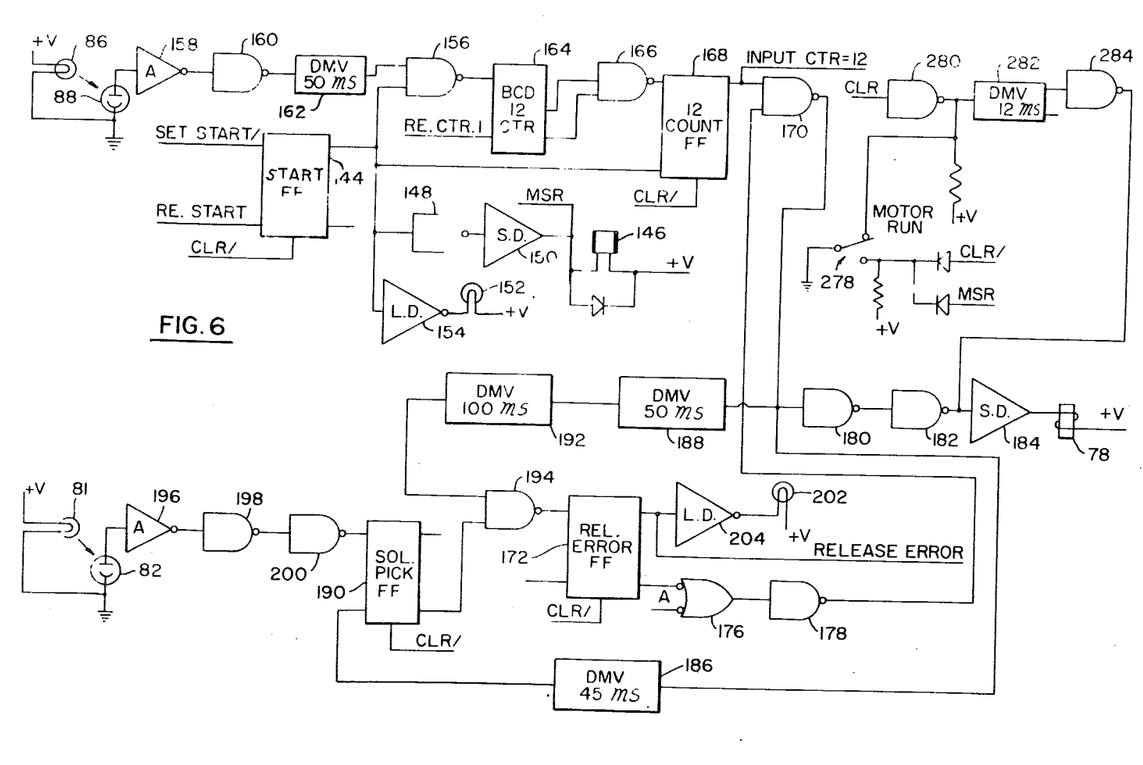
FIGS. 6 and 7 show details of the automatic control circuit used with the disclosed invention.

When the 1-millisecond SET START/pulse goes low, a START flip flop 144, shown by FIG. 6, will be set, its set output going high, energizing a motor control relay 146 through a gate 148 and a solenoid driver 150. A MOTOR ON indicator lamp 152 is also energized through a lamp driver 154 to provide visual evidence that the motor has been energized. The high set output of the flip flop 144 also enables one leg of the gate 156.

When the motor control relay 146 is energized, the motor 48 (FIG. 1) will be supplied with electrical power; and the horizontal drive shaft 50, the input shaft 54 and the input coupling shaft 56 will be thereby rotated, as will also be the clutch input hub 62 through the mounting collar 70. At this point, the solenoid 78 is not energized; and the pawl 76 is in engagement with and intermitting rotation of the clutch control ratchet 64, thus preventing the clutch output shaft 66 from being rotated.

As the input shaft 54 is rotated, the input monitor disk 83 mounted thereon also rotates, its four apertures being revolved effectively between the input monitor lamp 86 and the input monitor light detector 88. Each time an aperture passes therebetween and exposes the detector to light from the lamp, the detector completes a circuit from a ground potential to the input of a cell amplifier 158 (FIG. 6). This signal is inverted by that amplifier and again by a gate 160 before it is fed to a 50-millisecond DMV 162. When the input to the DMV goes low, its output emits a positive, 50-millisecond pulse which enables the remaining leg of the gate 156. The resulting low pulse from this gate is applied to the binary count to decimal (BCD) 12 counter 164.

When the input monitor disk 83 has completed three complete rotations, an angular displacement employed to provide a uniform distribution of lubricant within the clutch 60, the counter 164 will have reached a count of 12. At this point its 4-count and 8-count outputs will both be high, enabling both inputs to a gate 166, the resulting low output from which will set a 12-COUNT flip flop 168. The resulting high set output from the flip flop 168 will enable one leg of a gate 170 and provide the signal INPUT CTR. = 12.

The reset outputs of a REL. ERROR flip flop 172 and of an 11-COUNT flip flop 174 (FIG. 7), both outputs being high at this time since the respective flip flops are reset, are fed to a gate 176. The resulting low output from this gate is inverted by a gate 178, the high output from which enables the remaining leg of the gate 170. The resulting low output from this gate is fed through and doubly inverted by a pair of series gates 180 and 182, and the solenoid 78 is energized by the solenoid driver 184.

The low output from the gate 170 is also applied to both a 45-millisecond DMV 186 and also to a 50-millisecond DMV 188. The output of the DMV 186 provides a low pulse which is applied to the reset input of a SOL. PICK flip flop 190 holding it reset for 45 milliseconds to ensure that any spurious pawl movements will not generate erroneous signals. The output of the DMV 188 provides a high pulse, which is applied to the input of a 100-microsecond DMV 192. When this pulse goes low after 50 milliseconds, the DMV 192 provides a high pulse at its output which enables one leg of a gate 194 for 100-microseconds.

When the solenoid 78 is energized, its armature 80 should pivot the pawl 76 out of engagement with the clutch control ratchet 64 and into the path of light passing from the pawl monitor lamp 81 to the pawl monitor light detector 82. When the light is interrupted, the input to a cell amplifier 196 to which the detector 82 is connected goes high, the output of the amplifier 196 going low, this low signal being applied to the set input of the SOL. PICK flip flop 190 after being doubly inverted by the gates 198 and 200 connected in series therebetween.

If the pawl 76 has indeed disengaged from the clutch control ratchet 64 before the 50-millisecond DMV 188 triggers the 100-microsecond DMV 192 to apply its high output pulse to one leg of the gate 194, the SOL. PICK flip flop will be set, its reset output applying a low to the remaining leg of the gate 194, keeping it disabled during the 100-microsecond pulse time.

If the pawl fails to disengage during the allotted time, the SOL. PICK flip flop will remain reset and the gate 194 will be enabled, setting the REL. ERROR flip flop 172 with its low output. When this flip flop is set, the resulting high on its set output will provide a RELEASE ERROR signal and light a RELEASE ERROR indicator lamp 202 through an inverting lamp driver 204. This indication provides visual evidence that the apparatus has detected a test apparatus malfunction.

When the RELEASE ERROR signal goes high, a gate 206 (FIG. 5) is enabled, its resulting low output constituting a RE. START signal which resets the START flip flop 144. It should also be noted at this time that manually closing the STOP switch 208 will also provide a low level to reset the START flip flop 144. When this flip flop 144 is reset, its set output will go low, resetting the 12-COUNT flip flop 168 and thereby de-energizing the solenoid 78, dropping the motor control relay 146 and thereby stopping the motor 48, and extinguishing the MOTOR ON indicator lamp 152.

If there is no release error, the sequence of operation will continue. Once the solenoid 78 (FIG. 1) has been actuated, the clutch 60 will engage; and its control ratchet 64 and output shaft 66 will begin to rotate with its input hub 62. The output monitor disk 90, operatively coupled thereto, will also rotate, its slots 91 being revolved between the output monitor lamp 94 and the output monitor light detector 96. When a slot passes therebetween, exposing the detector to the light from the lamp, the input of the associated cell amplifier 124 is driven low. The resulting high output from the amplifier is inverted by the gate 126 and is applied to the input of a 12-millisecond DMV 210.

The high pulse appearing at the DMV 210 output enables one leg of a gate 212. Since the 12-COUNT flip flop 168 (FIG. 6) has been set, the signal INPUT CTR. = 12 will be high, enabling the remaining leg of the gate 212. The resulting low output from this gate is applied to the BCD 11-counter 214. Each time a slot on the output monitor disk 90 exposes the output monitor light detector 96 to light from the output monitor lamp 94, the 11-counter will be similarly provided with a 12-millisecond input pulse.

When eleven such pulses have been applied to the 11-counter 214 input, signifying that the clutch output shaft 66 and control ratchet 64 have been rotated through 11 of their 12 angular positions, a low appears at its output. A 20-millisecond DMV 216 to which this low output is applied provides at one of its outputs a high pulse, 11-COUNT, which is inverted by a gate 218 to provide a low pulse, RE. S.T. CTR., which is applied to the reset input of a BCD 2-counter 220. This signal is also provided through a gate 222 when the START switch 134 is first closed.

At another of its outputs, the DMV 216 provides a low pulse to set the 11-COUNT flip flop 174. When this flip flop sets, its high, set output enables one leg of a gate 224, the remaining leg of which is enabled each time a slot 91 in the output monitor disk 90 passes between the output monitor lamp 94 and light detector 96. The resulting low output pulse of the gate 224 is applied to the set input of the BCD 2-counter 220, which records its arrival.

The low, reset output of the flip flop 174 is doubly inverted by the gates 176 and 178 (FIG. 6) and disables one leg of the gate 170. The resulting high output of this gate is doubly inverted by the gates 180 and 182 and de-energizes the solenoid 78, allowing the pawl 76 to once again engage a tooth on the clutch control ratchet 64. The tooth engaged should be the eleventh from the one last engaged.

If the control ratchet 64 continues to rotate more teeth past the pawl than the allowed 11, another slot 91 on the output monitor disk 90 will pass between the output monitor lamp 94 and light detector 96, enabling the gate 224 a second time. The second low output pulse from this gate will be applied to the BCD 2-counter 220. When the counter 220 thus reaches a count of two, a high will appear at its output. This high is inverted by a gate 226 and returned to the input of the counter 220 to hold it in its present state. The high output is also inverted by a gate 228 to form the signal RE.OSC.FF, which is applied to the reset input of an OSC.ERROR flip flop 230 to hold it in a reset state. The output from the counter 220 also actuates a S.T. ERROR indicator lamp 232 by way of a lamp driver 234. This indication provides visual evidence that the apparatus has malfunctioned and detected a skippedtooth error.

The 2-counter output also enables a gate 236 (FIG. 5), the low output of which also forms the signal RE.-START, which resets the START flip flop 144 (FIG. 6). When this flip flop is reset, its set output will go low, resetting the 12-count flip flop 168 and thereby de-energizing the solenoid 78, de-energizing the motor control relay 146 and thereby stopping the motor 48, and extinguishing the MOTOR ON indicator lamp 152.

When the pawl 76 engages a tooth of the control ratchet 64 of a clutch being tested, the output of the clutch should cease to rotate. The second disk 18 should remain stationary; and the light detectro 14 after passing through the first and second disks, 16 and 18 respectively, should be constant.

Any angular displacement of the clutch output will result in an identical displacement of the second disk 18, varying the amount of light received by the detector 14. The output of the detector 14 is applied to a differential amplifier 238, the output of which is fed to a pair of differential amplifiers 240 and 242. The amplifier 238 serves to amplify the signal provided by the detector 14 in response to variations in the light received thereby. The amplifier 238 also blocks the DC component of that output.

The low, reset output of the 11-COUNT flip flop 174 is also applied to the input of a 300-millisecond DMV 244. A high, 300 millisecond pulse appears at the output of the DMV 244, which forms a signal, OSC.STB.DLY. This signal is applied to the input of an inverter 246, the output of which energizes a relay 247. The inputs of the amplifiers 240 and 242 are held low for 300-milliseconds through the contacts of this relay.

The amplifier 242 accommodates the positive-going signals received from the amplifier 238, and the amplifier 240 accommodates the negative-going alternations of the signal therefrom after the 300-millisecond delay. The outputs of the amplifiers 240 and 242 are applied to the inputs of a differential amplifier 248, wherein the difference between the input levels is amplified. The resulting signal, being a function of any change in angular displacement of the clutch output after the 300-millisecond delay, is applied to a comparator amplifier 250 wherein it is compared to a reference level. If the input signal is less than the reference level, thereby indicating that clutch output rotation or change in angular displacement was below an allowable amount, the output of the amplifier 250 will remain low.

If, however, the comparison indicates the change in angular displacement of the clutch output was above the allowable level, the output will go high. At the end of the 300-millisecond, OSC.STB.DLY. pulse, a 250-millisecond DMV 252 to which that pulse is applied will generate a high pulse. This pulse enables one leg of a gate 254 for 250-milliseconds. If the clutch output has moved an undesirable amount during this period, the detection of which has just been described, the remaining leg of this gate will also be enabled by the high output of the amplifier 250.

The resulting low output from the gate 254 sets the OSC.ERROR flip flop 230, the high, set output of which constitutes a signal, OSC. ERROR. This signal is applied to a gate 256 (FIG. 5), the low output of which also forms the signal RE.START, which resets the START flip flop 144 (FIG. 6). When this flip flop is reset, its set output will go low, resetting the 12-count flip flop 168 and thereby de-energizing the solenoid 78, de-energizing the motor control relay 146 and thereby stopping the motor 48, and extinguishing the MOTOR ON indicator lamp 152. The high, set output of the OSC.ERROR flip flop 230 also actuates an OSC.ERROR indicator lamp 258 by way of a lamp driver 260.

Also connected to the output of the 250-millisecond DMV 252 is a 100-microsecond DMV 262, which emits a pulse when the 250-millisecond search pulse goes low. This pulse enables one leg of a gate 264, the remaining leg of which is enabled by the high, reset output of the OSC.ERROR flip flop 230 when there is no oscillation error. The resulting low output pulse from the gate 264 constitutes the RE. 11-COUNT FF pulse, which resets the 11-COUNT flip flop 174 after every successful clutch position test.

Each time the clutch output is stopped after rotating through 11 of its 12 positions, the low, reset output of the 11-COUNT flip flop 174 will store a count in the BCD 13-counter 266. When the count of the counter has reached 13, indicating that all 12 of the positions of the clutch have been tested, a low will appear at the output of the counter, setting a 13-COUNT flip flop 268. The low, reset output of this flip flop is doubly inverted by a pair of gates 270 and 272 to also form the signal RE.START. As previously described, this signal resets the START flip flop 144 (FIG. 6). When this flip flop is reset, its set output will go low, resetting the 12-count flip flop 168 and thereby de-energizing the solenoid 78, de-energizing the motor control relay 146 and thereby stopping the motor 48, and extinguishing the MOTOR ON indicator lamp 152. The high, set output of the 13-COUNT flip flop 268 actuates an END OF TEST indicator lamp 274 by way of a lamp driver 276.

A RESET switch 286 is also provided so that the signals CLR/, RE.CTR.1 and RE.CTR.2 may be generated at any time by manually actuating the momentary-contact switch. When the contacts of this switch are closed, a low level is applied to the output of the gate 140, this level constituting CLR/ and being doubly inverted by the gates 118 and 120 to form the signal RE.CTR.1 and also being doubly inverted by the gates 118 and 122 to form the signal RE.CTR.2.

Provision is also made to run the drive motor to test the internal spring torque of a clutch manually without involving the majority of the logic of the device. A MOTOR RUN switch 278 (FIG. 6) is incorporated which, when closed, provides low level signals CLR/ and MSR to hold the logic flip flops reset and actuate the motor control relay 146 respectively, the latter action energizing the drive motor 48. With the motor running, the clutch may be advanced one position by pressing the momentary-contact START switch 134. As previously described, this action generates a 2-millisecond CLR pulse (FIG. 5). This pulse is applied to a gate 280 (FIG. 6), the resulting low output of which triggers a 12-millisecond DMV 282. The DMV produces a high pulse which is inverted by a gate 284 to energize the solenoid 78 for 12-milliseconds by way of the solenoid driver 184. Suitable means may be applied to the clutch output to measure the internal spring torque. When the MOTOR RUN switch 278 is returned to its normal position as shown, a low level is applied to the output of the gate 280, disabling the associated motor run logic.

While the motion test system has been shown and described in considerable detail, it should be understood that many changes and variations may be made therein without departing from the spirit and scope of the invention as set forth in the appended claims.

What is claimed is:

1. In an apparatus for detecting angular motion of a rotatable member, said apparatus including means for providing a path of light emissions, and light detecting means responsive to said path of light emissions for providing an electrical output corresponding to the detected emissions, the improvement comprising:

stationary optically apertured means disposed in said path of light emissions said stationary optically apertured means having a pattern radiating helically from a point on said stationary optically apertured means outward of alternating light permeable and opaque areas; and rotatable optically apertured means disposed in said path of light emissions and coupled to said rotatable member for rotation therewith, said rotatable optically apertured means having a pattern radiating helically from the axis of rotation of said rotatable optically apertured means outward of alternating light permeable and opaque areas, said helical patterns interacting in said path of light emissions for continuously varying the amount of light from said path detected by said light detecting means in response to rotation of said rotatable optically apertured means relative to said stationary optically apertured means.

2. In the apparatus of claim 1, the further improvement wherein said stationary optically apertured means and said rotatable optically apertured means are substantially parallel disks having identical patterns radiating outward in the same direction and wherein said light permeable and opaque areas increase in width from said axis of rotation of said rotable disk and from said point on said stationary disk.

3. In the apparatus of claim 1 the improvement further comprising:

analog logic means for comparing the electrical output from said light detecting means to a predetermined electrical level corresponding to a predetermined acceptable magnitude of angular motion of said rotatable member.

4. In the apparatus of claim 3, the further improvement wherein said light detecting means includes means for producing positive-going electrical output signals upon rotation of said rotatable optically apertured means in a first direction, and negative-going electrical output signals upon rotation of said rotatable optically apertured means in a second direction opposite said first direction; first amplifier means for individually amplifying said positive-going electrical output signals; second amplifying means for individually amplifying said negative-going electrical output signals; means for differentially amplifying both said individually amplified positive-going and negative-going electrical output signals for providing an amplified difference signal representative of angular oscillation of said rotatable member and means for comparing said amplified difference signal to said predetermined electrical level for producing a digital output signal whenever said amplified difference signal exceeds said predetermined electrical level.

5. The apparatus of claim 4, wherein said analog means further comprises means for delaying said comparing means for a predetermined stabilization time period.

6. The apparatus of claim 5, wherein the improvement further comprises means responsive to digital output from said comparing means for indicating angular oscillation of said rotatable member greater than said acceptable magnitude after said stabilization time period.

7. In the apparatus of claim 1, the further improvement wherein a plurality of said alternating light permeable and opaque areas of said stationary optically apertured means intersect an imaginary straight line radiating outward from said point on said stationary optically apertured means.

8. In the apparatus of claim 7, the further improvement wherein a plurality of said alternating light permeable and opaque areas of said rotatable optically apertured means intersect an imaginary straight line radiating outward from the axis of rotation of said rotatable optically apertured means.

9. In the apparatus of claim 8, the further improvement wherein said stationary optically apertured means and said rotatable optically apertured means both include identical patterns radiating helically outward in the same direction.

10. In the apparatus of claim 9, the further improvement wherein said light permeable and opaque areas of said stationary optically apertured means increase in width from said point and wherein said light permeable and opaque areas of said rotatable optically apertured means increase in width from said axis of rotation of said rotatable optically apertured means.

* * * * *